(12) United States Patent
Ho et al.

(10) Patent No.: US 11,221,460 B2
(45) Date of Patent: Jan. 11, 2022

(54) LENS CLIP FOR COUPLING AND OPTICAL ALIGNMENT OF AN OPTICAL LENS ARRAY AND AN OPTICAL SUBASSEMBLY MODULE IMPLEMENTING SAME

(71) Applicant: Applied Optoelectronics, Inc., Sugar Land, TX (US)

(72) Inventors: I-Lung Ho, Sugar Land, TX (US); Hsiu-Che Wang, Rosenberg, TX (US); Qin Li, Houston, TX (US)

(73) Assignee: Applied Optoelectronics, Inc., Sugar Land, TX (US)

( * ) Notice: Subject to any disclaimer, the term of this patent is extended or adjusted under 35 U.S.C. 154(b) by 211 days.

(21) Appl. No.: 16/514,580

(22) Filed: Jul. 17, 2019

(65) Prior Publication Data
US 2021/0018716 A1    Jan. 21, 2021

(51) Int. Cl.
*G02B 7/02* (2021.01)
*H04B 10/50* (2013.01)

(52) U.S. Cl.
CPC ............ *G02B 7/026* (2013.01); *G02B 7/021* (2013.01); *G02B 7/025* (2013.01); *H04B 10/503* (2013.01)

(58) Field of Classification Search
CPC ...... H04B 10/503; G02B 7/021; G02B 7/026; G02B 7/02; G02B 7/025

USPC .......................................................... 359/818
See application file for complete search history.

(56) References Cited

U.S. PATENT DOCUMENTS

| | | | | |
|---|---|---|---|---|
| 5,412,509 A | * | 5/1995 | Nakata | G02B 7/021 347/258 |
| 8,562,141 B2 | * | 10/2013 | Ogino | G03B 21/208 353/38 |
| 9,061,378 B2 | * | 6/2015 | Yoshida | G02B 3/0075 |
| 2013/0057834 A1 | * | 3/2013 | Yoshida | F21V 5/04 353/38 |
| 2019/0129196 A1 | * | 5/2019 | Masson | G02B 27/0101 |

* cited by examiner

*Primary Examiner* — William R Alexander
(74) *Attorney, Agent, or Firm* — Grossman Tucker Perreault & Pfleger, PLLC; Norman S. Kinsella

(57) ABSTRACT

The present disclosure is generally directed to a lens clip that defines at least one mounting surface for coupling to and supporting an array of optical components, e.g., a laser diode and associated components, and an optical lens slot to receive and securely hold an array of optical lenses at a predetermined position relative to the optical components to ensure nominal optical coupling. The optical lens slot includes dimensions that permit insertion of each optical lens into the same and restrict travel along one or more axis. Accordingly, disposing an optical lens within the lens slot ensures correct alignment along at least two axis, e.g., Z and X, with the third axis (e.g., Y) extending parallel along the slot to permit lateral adjustment of each lens.

11 Claims, 8 Drawing Sheets

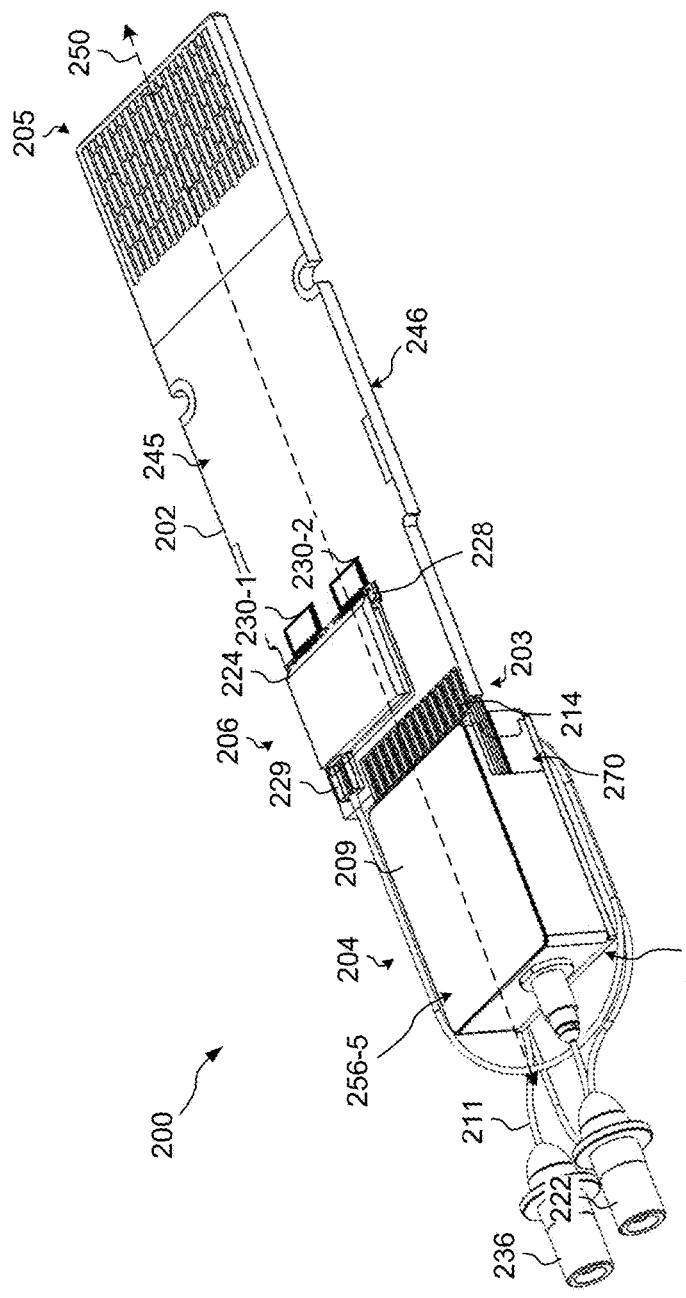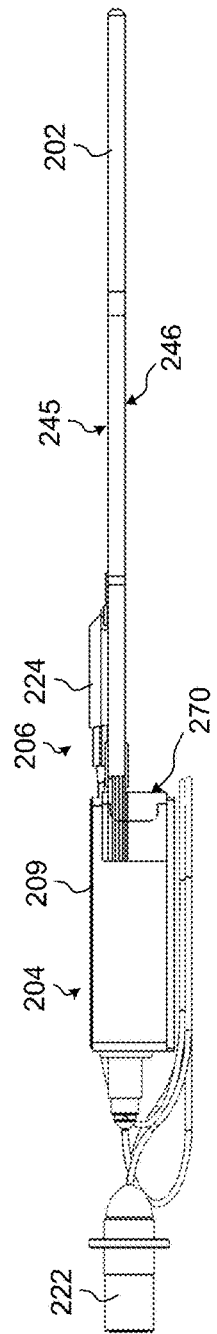
FIG. 2
FIG. 3

ND OPTICAL LENS ARRAY
LENS CLIP FOR COUPLING AND OPTICAL ALIGNMENT OF AN OPTICAL LENS ARRAY AND AN OPTICAL SUBASSEMBLY MODULE IMPLEMENTING SAME

TECHNICAL FIELD

The present disclosure relates to optical communications, and more particularly, to a lens clip that securely holds and maintains an optical lens array in alignment with associated optical components, e.g., a laser diode, arrayed waveguide grating, to simplify manufacturing and reduce the impact of post-annealing shift that occurs when using, for example, ultraviolet-curing (UV-curing) optical adhesives.

BACKGROUND INFORMATION

Optical transceivers are used to transmit and receive optical signals for various applications including, without limitation, internet data center, cable TV broadband, and fiber to the home (FTTH) applications. Optical transceivers provide higher speeds and bandwidth over longer distances, for example, as compared to transmission over copper cables. The desire to provide higher transmit/receive speeds in increasingly space-constrained optical transceiver modules has presented challenges, for instance, with respect to establishing and maintaining proper orientation and alignment of optical components during manufacturing.

Optical transceiver modules generally include one or more transmitter optical subassemblies (TOSAs) for transmitting optical signals. TOSAs can include one or more lasers to emit one or more channel wavelengths and associated passive and/or active supporting components. Such supporting components include, for example, laser diode drivers (LDDs), focusing lenses, and multiplexing devices (e.g., arrayed waveguide grating (AWG)). Each component may be securely attached to a housing/substrate at pre-defined positions relative to each other to assemble a TOSA. For instance, components such as a laser diode and AWG may be die bonded adjacent one or more laser diodes. On the other hand, components such as focusing lenses may be attached using adhesives such as UV-curing optical adhesives. However, such adhesives can cause misalignment of components, which is known as post-annealing shift, which results from the structural changes to an adhesive as it cures/hardens. Also, in the context of multi-channel optical subassemblies, a plurality of focus lenses can be utilized. This can require keeping each focus lens within a relatively narrow tolerance that ensures nominal optical power. During active alignment, this can require multiple iterations of shifting focus lens position/orientation and then re-testing.

BRIEF DESCRIPTION OF THE DRAWINGS

These and other features and advantages will be better understood by reading the following detailed description, taken together with the drawings wherein:

FIG. 2 is a perspective view of a multi-channel optical transceiver module consistent with the present disclosure.

FIG. 3 is a side view of the multi-channel optical transceiver module of FIG. 2, consistent with an embodiment of the present disclosure.

DETAILED DESCRIPTION

Figure 1:
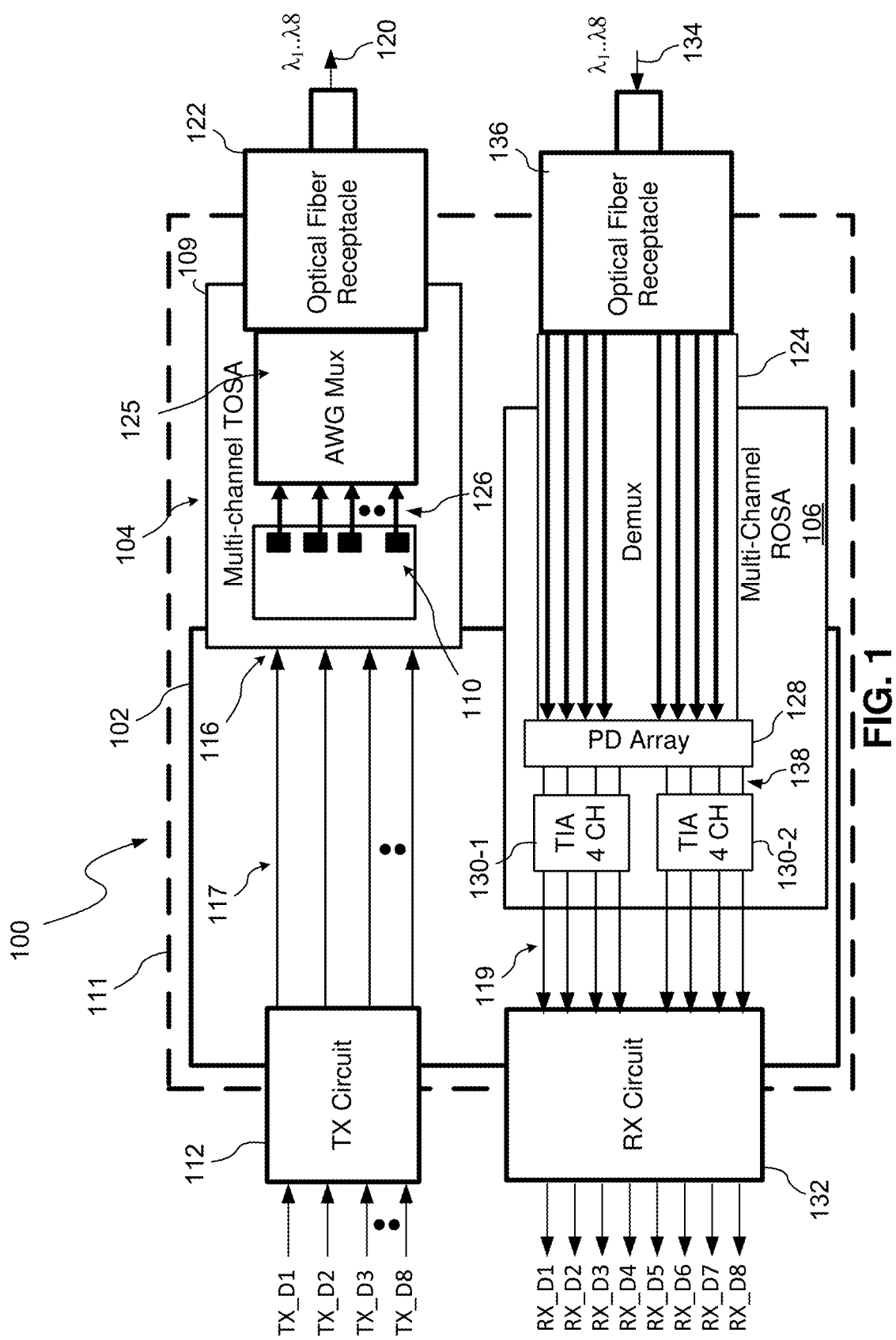
FIG. 1 is a block diagram of a multi-channel optical transceiver, consistent with embodiments of the present disclosure.
Figure 4:
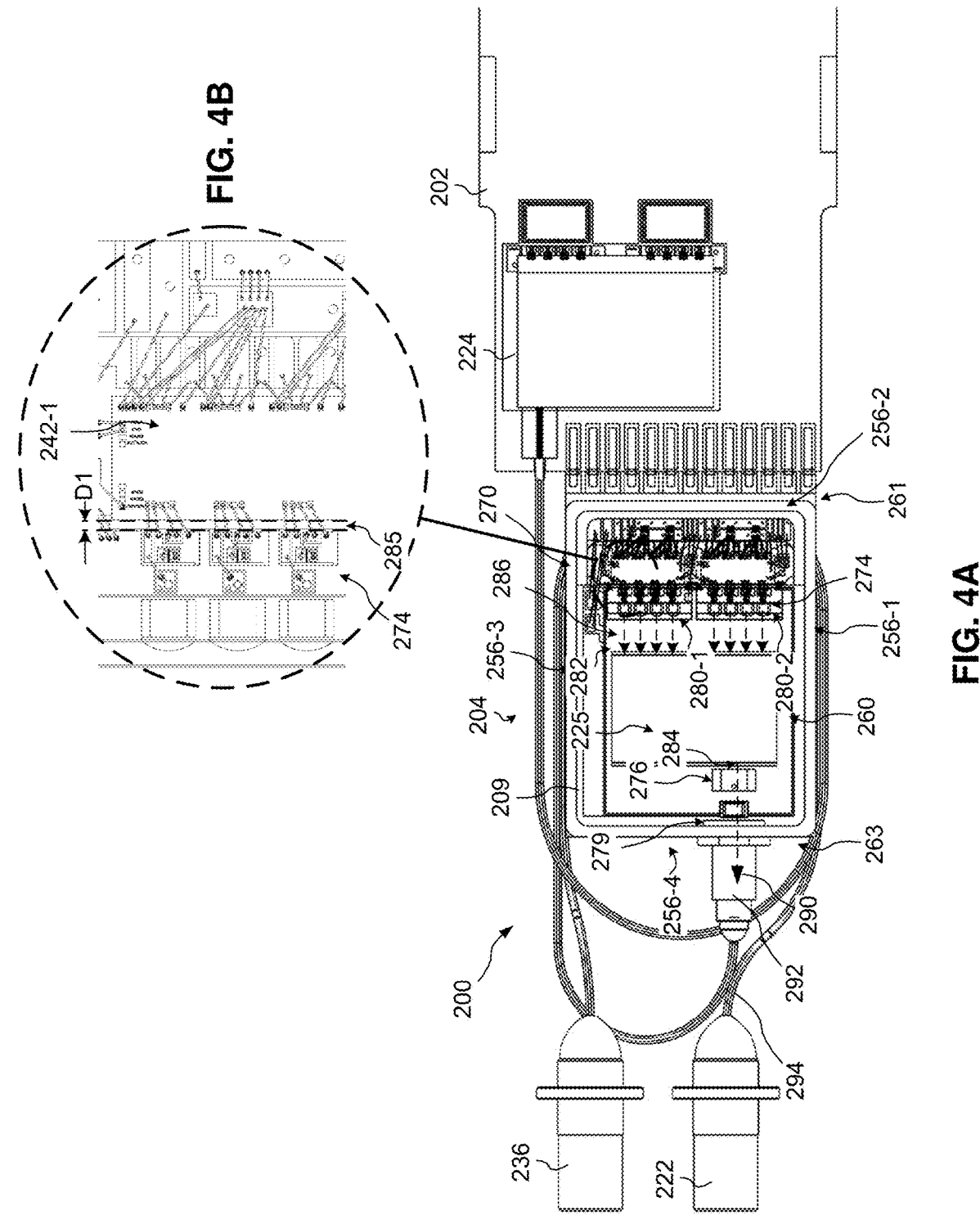
FIG. 4A shows a top-down view of a multi-channel TOSA arrangement of the multi-channel optical transceiver module of FIG. 2, in accordance with an embodiment of the present disclosure.
FIG. 4B shows an enlarged portion of the multi-channel TOSA arrangement of FIG. 4A.
Figure 5:
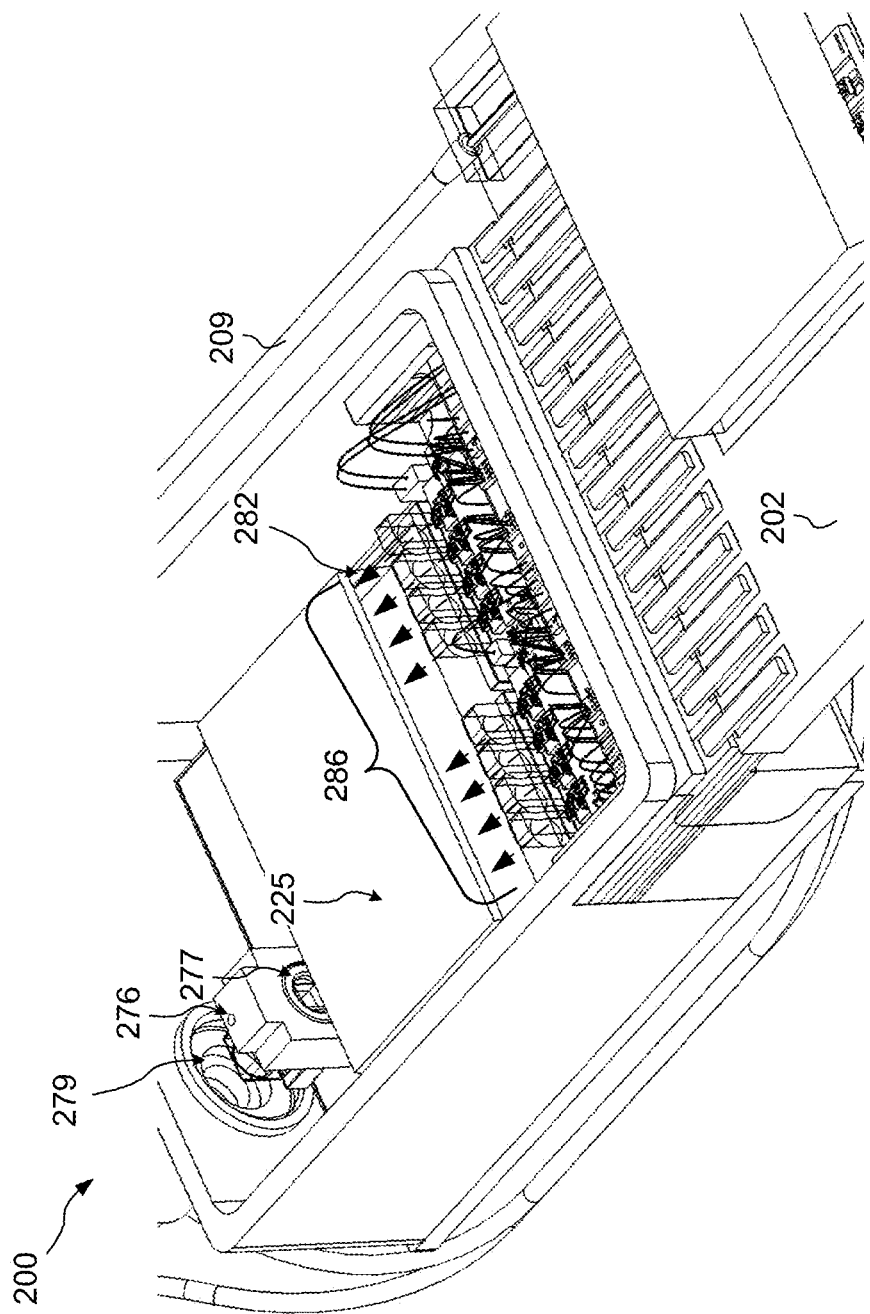
FIG. 5 shows another perspective view of the multi-channel TOSA arrangement of FIG. 4A in accordance with an embodiment of the present disclosure.

Present approaches to producing multi-channel TOSAs include coupling each laser diode and associated optical components, e.g., lenses, monitor photodiodes, etc., within a TOSA separately and performing power measurements and realignment iterations (also known as active alignment) essentially on a per-channel basis. As TOSAs scale and include ever increasing channel density, such per-channel active alignment processes introduce significant complexity, time per unit, and ultimately reduce yield. Continued scaling and rapid development of TOSA modules depends at least in part on simplifying optical alignment of laser diodes and associated components, and increasing alignment tolerances therebetween.

The present disclosure is generally directed to a lens clip that defines at least one mounting surface for coupling to and supporting an array of optical components, e.g., a laser diode and associated components, and an optical lens slot to receive and securely hold an array of optical lenses, e.g., focus lenses, at a predetermined position relative to the optical components to ensure nominal optical coupling. The optical lens slot includes dimensions that permit insertion of each optical lens into the same and restrict travel/displacement along one or more axis. Accordingly, disposing an optical lens within the lens slot ensures correct alignment along at least two axis, e.g., by fixing the optical lens along the Z and X axis, with the third axis (e.g., Y axis) extending parallel along the slot to permit lateral adjustment of each optical lens. Thus, assembly of an optical subassembly, such as a TOSA, can include mounting of optical components such as laser assemblies to the mounting surface of the lens clip and then insertion of each focus lens within the lens slot for alignment purposes prior to, or after, insertion of the lens clip into a cavity of a TOSA housing.

Thus, a lens clip consistent with the present disclosure can significantly reduce manufacturing complexity, manufacturing time per unit, misalignment errors, and increase active alignment tolerances compared to other approaches that that couple and align each laser and focus lens individually on a per-channel basis. Moreover, each lens clip can include a lens slot capable of coupling to, for instance, four or more focus lenses. Therefore, after each focus lens and laser diode gets coupled together and aligned via the lens clip, alignment with other optical components such as an optical multiplexer within a TOSA housing can be achieved by simply shifting the lens clip along the X or Y axis rather than individually adjusting the position of each separate laser and lens. Likewise, two or more lens clips and associated lenses and laser diodes can be assembled at least partially outside of a TOSA housing, and then disposed in the TOSA housing for mounting and optical alignment with multiplexer(s), transmit fiber(s), and so on. Thus, two or more lens clips can be utilized to increase channel counts to eight (8) or more, with at least a portion of assembly of the lens clip and associated components being optionally performed outside of the relatively space-constrained TOSA housing to advantageously reduce the risk of, for example, alignment errors and component damage.

Accordingly, multi-channel TOSAs having lens clips consistent with the present disclosure can be assembled with 4, 8, 16, 24, 32 or N-channels in a manner that allows for optical alignment of multiple laser diodes and associated diodes in groups of two or more (depending on lens slot dimension, desired channel counts, etc.), which advantageously avoids the necessity of performing active test and re-alignment iterations for each individual laser and associated component.

In addition, the present disclosure has identified that lens clips formed from transparent material, e.g., capable of passing at least 50-80% of incident wavelengths and preferably 90-100% of incident UV wavelengths, significantly improves the structural integrity and reliability achieved through the use of UV-curing epoxies to attach focus lenses to a lens clip. In particular, an optical lens can be disposed in a manner that "bottoms out" (e.g., directly contacts a bottom surface defining the lens slot) such that epoxy gets disposed between adjacent optical lenses and/or the interstitial space between optical lenses and adjacent sidewalls of the lens slot while blocking/preventing all, or at least a majority, of epoxy from flowing beneath each lens. Thus, travel/displacement vertically along the Z axis during curing gets negated by avoiding epoxy welling beneath optical lenses, and post-anneal shifting along the X and Y axis is essentially nullified by substantially uniform amounts of expansion and contraction of UV-curing epoxy around each focus lens. This ensures that post-annealing shift is reduced or otherwise minimized to maintain optical alignment, and by extension, nominal optical power.

While the following disclosure includes examples and scenarios directed specifically to a lens clip being used in a transmitter optical subassembly (TOSA) arrangement, this disclosure is not limited in this regard. For example, a lens clip consistent with the present disclosure may be utilized to align and mount optical lenses in receiver optical subassembly (ROSA) arrangements.

As used herein, "channel wavelengths" refer to the wavelengths associated with optical channels and may include a specified wavelength band around a center wavelength. In one example, the channel wavelengths may be defined by an International Telecommunication (ITU) standard such as the ITU-T dense wavelength division multiplexing (DWDM) grid. This disclosure is equally applicable to coarse wavelength division multiplexing (CWDM). In one specific example embodiment, the channel wavelengths are implemented in accordance with local area network (LAN) wavelength division multiplexing (WDM), which may also be referred to as LWDM.

The term "coupled" as used herein refers to any connection, coupling, link or the like and "optically coupled" refers to coupling such that light from one element is imparted to another element. Such "coupled" devices are not necessarily directly connected to one another and may be separated by intermediate components or devices that may manipulate or modify such signals. On the other hand, the term "direct optical coupling" refers to an optical coupling via an optical path between two elements that does not include such intermediate components or devices, e.g., a mirror, waveguide, and so on, or bends/turns along the optical path between two elements.

The term substantially, as generally referred to herein, refers to a degree of precision within acceptable tolerance that accounts for and reflects minor real-world variation due to material composition, material defects, and/or limitations/peculiarities in manufacturing processes. Such variation may therefore be said to achieve largely, but not necessarily wholly, the stated/nominal characteristic. To provide one non-limiting numerical example to quantify "substantially," such a modifier is intended to include minor variation that can cause a deviation of up to and including ±5% from a particular stated quality/characteristic unless otherwise provided by the present disclosure.

As used herein, the terms hermetic-sealed and hermetically-sealed may be used interchangeably and refer to a housing that releases a maximum of about $5*10^{-8}$ casec of filler gas. The filler gas may comprise an inert gas such as nitrogen, helium, argon, krypton, xenon, or various mixtures thereof, including a nitrogen-helium mix, a neon-helium mix, a krypton-helium mix, or a xenon-helium mix.

Referring to the Figures, FIG. 1, an optical transceiver 100, consistent with embodiments of the present disclosure, is shown and described. The optical transceiver module 100 is shown in a highly simplified form for clarity and ease of explanation and not for purposes of limitation. In this embodiment, the optical transceiver 100 includes a multi-channel transmitter optical subassembly (TOSA) arrangement 104 and a multi-channel receiver optical subassembly (ROSA) arrangement 106 coupled to a substrate 102, which may also be referred to as an optical module substrate. The substrate 102 may comprise, for example, a printed circuit board (PCB) or PCB assembly (PCBA). The substrate 102 may be configured to be "pluggable" for insertion into an optical transceiver cage 111.

In the embodiment shown, the optical transceiver 100 transmits and receives eight (8) channels using eight different channel wavelengths ($\lambda 1 \ldots \lambda 8$) via the multi-channel TOSA arrangement 104 and the multi-channel ROSA arrangement 106, respectively, and may be capable of transmission rates of at least about 25 Gbps per channel, and preferably 50 Gbps per channel. The optical transceiver 100 may also be capable of transmission distances of 2 km to at least about 10 km. The optical transceiver 100 may be used, for example, in internet data center applications or fiber to the home (FTTH) applications. Although the following examples and embodiments show and describe a 8-channel optical transceiver, this disclosure is not limited in this regard. For example, the present disclosure is equally applicable to 2, 4, 6-channel configurations.

In more detail, the multi-channel TOSA arrangement 104 includes a TOSA housing 109 with a plurality of sidewalls that define a cavity. The cavity includes a plurality of laser arrangements 110, a multiplexing device 125, and a feedthrough device 116 disposed therein. The multi-channel TOSA arrangement 104 may be implemented as the multi-channel TOSA arrangement 204 of FIGS. 2-7 with at least one laser diode driver (LDD) disposed/mounted on the feedthrough device 116, which will be discussed in greater detail below. In an any event, each laser arrangement of the plurality of laser arrangements 110 can be configured to transmit optical signals having different associated channel wavelengths. Each laser arrangement can include passive and/or active optical components such as a laser diode (LD), optical isolator, focus lens, monitor photodiode (MPD), and so on.

To drive the plurality of laser arrangements 110, the optical transceiver 100 includes a transmit connecting circuit 112 to provide electrical connections to the plurality of laser arrangements 110 within the housing 109. The transmit connecting circuit 112 may be configured to receive driving signals (e.g., TX_D1 to TX_D8) from, for example, circuitry within the optical transceiver cage 111. The housing 109 may be hermetically sealed to prevent ingress of foreign material, e.g., dust and debris. Therefore, a plurality of transit (TX) traces 117 (or electrically conductive paths) may be patterned on at least one surface of the substrate 102 and electrically coupled to a feedthrough device 116 of the TOSA housing 109 to bring the transmit connecting circuit 112 into electrical communication with the plurality of laser arrangements 110, and thus, electrically interconnect the transmit connecting circuit 112 with the multi-channel TOSA arrangement 104. The feedthrough device 116 may comprise, for instance, ceramic, metal, or any other suitable material.

In operation, the multi-channel TOSA arrangement 104 may then receive driving signals (e.g., TX_D1 to TX_D8), and in response thereto, generate and launch multiplexed channel wavelengths on to an output waveguide 120 such as a transmit optical fiber. The generated multiplexed channel wavelengths may be combined based on a multiplexing device 125 such as an arrayed waveguide grating (AWG) that is configured to receive emitted channel wavelengths 126 from the plurality of laser arrangements 110 and output a signal carrying the multiplexed channel wavelengths on to the output waveguide 120 by way of optical fiber receptacle 122.

Continuing on, the multi-channel ROSA arrangement 106 includes a demultiplexing device 124, e.g., an arrayed waveguide grating (AWG), a photodiode (PD) array 128, and amplification circuitry 130, e.g., a transimpedance amplifier (TIA). An input port of the demultiplexing device 124 may be optically coupled with a receive waveguide 134, e.g., an optical fiber, by way of an optical fiber receptacle 136. An output port of the demultiplexing device 124 may be configured to output separated channel wavelengths on to the PD array 128. The PD array 128 may then output proportional electrical signals to the TIA 130, which then may be amplified and otherwise conditioned. The PD array 128 and the transimpedance amplifier 130 detect and convert optical signals into electrical data signals (RX_D1 to RX_D8) that are output via the receive connecting circuit 132. In operation, the PD array 128 may then output electrical signals carrying a representation of the received channel wavelengths to a receive connecting circuit 132 by way of conductive traces 119 (which may be referred to as conductive paths).

Referring to FIGS. 2-7 an example transceiver module 200 is shown consistent with an embodiment of the present disclosure. The example transceiver module 200 may be implemented as the optical transceiver 100 of FIG. 1. As shown, the optical transceiver module 200 includes a configuration to send and receive eight (8) different channel wavelengths in order to provide transmission speeds up to and an in excess of 400 Gb/s, for instance. However, other channel configurations are within the scope of this disclosure and the embodiment of FIGS. 2-7 are not intended to limit the present disclosure.

In more detail, the optical transceiver module 200 includes a substrate 202, multi-channel TOSA arrangement 204, and a multi-channel ROSA arrangement 206. In particular, the substrate 202 includes a first end 203 that extends to a second end 205 along a longitudinal axis 250. A first and second mounting surface 245, 246 disposed facing away from each other extend in parallel along the longitudinal axis 250 and define at least a portion of the substrate 202. The substrate 202 may comprise, for example, a printed circuit board assembly (PCBA) or other suitable substrate material. The multi-channel ROSA arrangement 206 is coupled to and supported by the first mounting surface 245 at a position proximate the first end 203 of the substrate 202. The multi-channel ROSA arrangement 206 can include on-board/integrated configuration as discussed and described in greater detail in the co-pending U.S. patent application Ser. No. 16/142,466 filed on Sep. 28, 2018 and entitled "Receiver Optical Subassembly (ROSA) Integrated On Printed Circuit Board Assembly," the entirety of which is incorporated herein by reference.

As shown in FIG. 2, the multi-channel ROSA arrangement 206 includes a demultiplexing device 224, e.g., an arrayed waveguide grating (AWG), with an input port 229 coupled to an optical coupling receptacle 236 by way of an intermediate waveguide 211 (e.g., an optical fiber). The demultiplexing device 224 further includes an output region aligned with a photodiode (PD) array 228. The PD array 228 electrically couples to the first and second amplification chips 230-1, 230-2, e.g., transimpedance amplifiers (TIAs). In operation, a multiplexed optical signal received via the optical coupling receptacle 236 gets demultiplexed by the demultiplexer 224. The demultiplexer 224 then outputs separated channel wavelengths on to corresponding photodiodes of the PD array 228. In turn, the PD array 228 outputs an electrical current to the amplification circuitry 230-1, 230-2 that is representative of the received and separated channel wavelengths. The amplification circuitry 230-1, 230-2 then amplifies the electrical currents from the PD array 228 and outputs a signal to, for instance, a data bus via the receive connecting circuit 132 (FIG. 1).

The multi-channel TOSA arrangement 204 is coupled to the first end 203 of the substrate 202 and includes a plurality of laser arrangements and optical connectors for outputting a plurality of channel wavelengths, as discussed in greater detail below. The TOSA arrangement 204 may be edge mounted to the substrate 202, as shown, although other suitable approaches are within the scope of this disclosure.

Turning specifically to the embodiment shown in FIG. 4A, the TOSA arrangement 204 includes a housing 209, which may also be referred to as a TOSA housing. The housing 209 is defined by a plurality of sidewalls 256-1 to 256-6 that define a cavity 260 therebetween. The plurality of sidewalls 256-1 to 256-6 extend from a first end 261 to a second end 263 along the longitudinal axis 250 (FIG. 2). However, the housing 209 may have other shapes and configurations and the provided example is not intended to be limiting.

Figure 6:
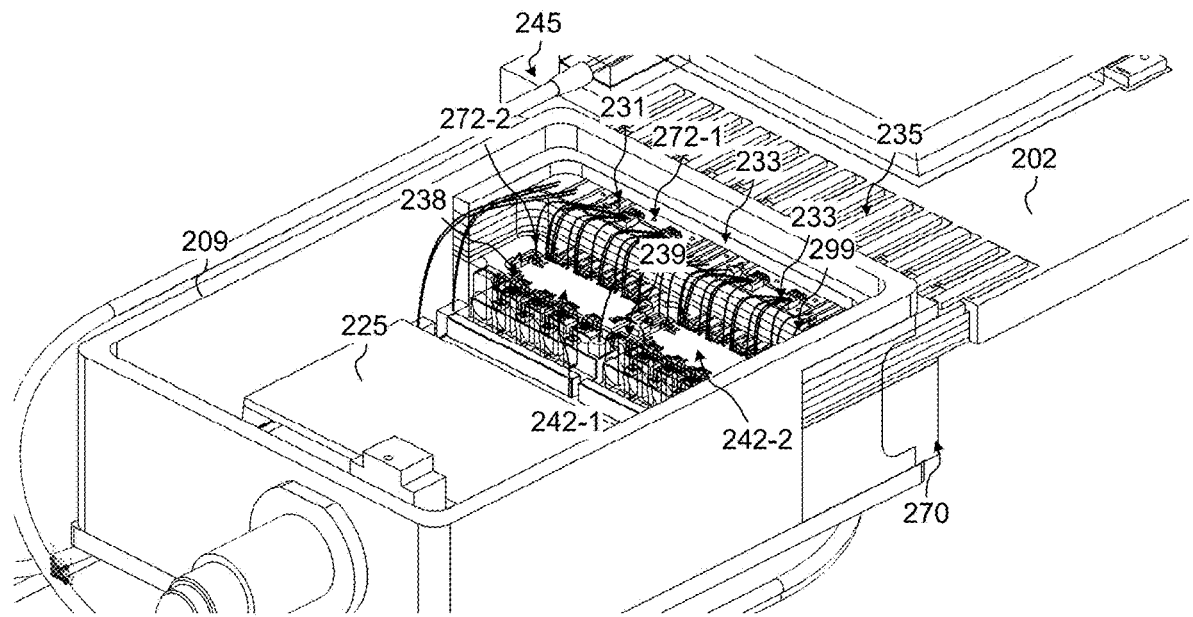
FIG. 6 shows another perspective view of the multi-channel TOSA arrangement of FIG. 4A in accordance with an embodiment of the present disclosure.

As further shown in the embodiment of FIG. 4A, with additional reference to FIG. 6, the TOSA arrangement 204 includes a feedthrough device 270, a plurality of laser arrangements 274, a multiplexing device 225, an optical isolator chip 276 and an output port 279. The feedthrough device 270 is disposed proximate the first end 261 of the housing 209 and extends at least partially into the cavity 260. In particular, a first portion 232-1 of the feedthrough device 270 extends at least partially into the cavity 260 and a second portion 232-2 may extend from the cavity 260 towards the substrate 202 for coupling purposes (see FIG. 6). Accordingly, the feedthrough device 270 defines at least a portion of the cavity 260.

The feedthrough device 270 may comprise, for example, a suitably rigid non-metal material such as inorganic material such as a crystalline oxide, nitride or carbide material, which may be commonly referred to as ceramic. Some elements, such as carbon or silicon, may also be considered ceramics, and are also within the scope of this disclosure.

Following the feedthrough device 270 a plurality of laser arrangements 274 are at least partially disposed on laser diode (LD) submounts 280-1, 280-2. Each laser arrangement of the plurality of laser arrangements 274 includes a laser diode, a monitor photodiode, and a focus lens. Each laser arrangement also includes a corresponding LD driver (LDD) chip 242 mounted to the feedthrough device 270. For example, as shown in the enlarged region of FIG. 4B, each of the laser arrangements 274 can include a laser diode that is disposed at a substantially uniform distance of D1 from an associated LDD chip, e.g., LDD chip 242-1. The embodiment of FIG. 4B also shows that each of the plurality of laser diodes 274 and associated LDD chip, e.g., LDD chip 242-1, may be mounted in a manner that causes the same to extend directly up to the edge of their respective mounting surfaces. To this end, only a relatively small air gap 285 (also having an overall width of D1) separates each of the laser diodes 274 and the associated LDD chips 242. As discussed in greater detail, the proximity of each LD chip to an associated LDD chip can significantly shorten the length of an interconnect device between the same, such as a wire bond. In addition, the gap 285 can advantageously provide thermal isolation.

Following the plurality of laser arrangements 274, a multiplexing device 225 is disposed at a midpoint within the cavity 260. In particular, the multiplexing device 225 includes an input region 282 facing the first end 261 of the housing 209, and more particularly the plurality of laser arrangements 274. The input region 282 includes a plurality of input ports that are aligned to receive channel wavelengths from LDs along an associated light path. Each of the laser arrangements 274 may then emit associated channel wavelengths on a corresponding light path of a plurality of input light paths 286 that intersect with the input region 282, which is more clearly shown in FIG. 5. Each light path of the plurality of light paths 286 therefore extends from an emission surface of an associated LD through a focus lens, and then ultimately to the input region 282.

The multiplexing device 225 further includes an output port 284 that is disposed opposite the input region 282 such that the output port 284 faces the second end of the housing 209. The output port 284 outputs a multiplexed signal along an output light path 290. An optical isolator 276 proximate the second end 263 of the housing 209 includes an aperture 277, by which the output light path 290 extends therethrough. Following the optical isolator 276, the housing 209 includes an opening/aperture for coupling to an optical coupling receptacle 292. The optical coupling receptacle 292 optically couples with the transmit optical coupling receptacle 222 by way of an intermediate fiber 294. Accordingly, the multiplexing device 225 outputs a multiplexed optical signal for transmission via light path 290.

Turning to FIG. 6, additional aspects of a feedthrough device 270 consistent with the present disclosure are shown. As shown, feedthrough device 270 may be defined by at least a first mounting surface 272-1 and a second mounting surface 272-2. Although denoted as "first" and "second," these designations are merely for purposes of clarity and are utilized simply to distinguish between the mounting surfaces 272-1, 272-2. To this end, either mounting surface may be referred to as a "first" or "second" surface. In any event, the first and second mounting surfaces 272-1, 272-2 may be formed integrally with the feedthrough device 270 as a single piece, e.g., allowing for direct coupling of components to the feedthrough device 270. However, in some cases the first and second mounting surfaces 272-1, 272-2 may be provided by one or more submounts. In either case, the feedthrough device 270 advantageously provides mounting regions that facilitate such direct or indirect mounting and support of components.

Continuing on, the first and second mounting surfaces 272-1, 272-2 may be substantially planar, such as shown, although the first and second mounting surfaces 272-1, 272-2 are not limited in this respect and other embodiments are within the scope of this disclosure. The first and second mounting surfaces 272-1, 272-1 extend in parallel relative to each other but are offset by a distance D (see FIG. 7) to provide a step structure or profile. To this end, the arrangement of the first and second mounting surfaces 272-1, 272-2 may collectively provide a "stepped," or multi-step mounting profile whereby the first and second mounting surfaces are adjoined by a surface 299 that extends substantially transverse to each and provides the offset distance D. The offset distance D may measure between 10 and 130 microns, and preferably 100 microns although other distances are within the scope of this disclosure.

The first mounting surface 272-1 may be substantially coplanar with the first mounting surface 245 of the substrate 202, or not, depending on a desired configuration. This may advantageously allow for electrical traces 233 disposed/patterned on the first mounting surface 272-1 to electrically couple with the substrate 202 via an interconnect device such as the bus bars 235. Power and RF signals may be then provided to the TOSA arrangement, and more particularly, optical components disposed within the cavity 260 of the housing 9. Accordingly, the first mounting surface 272-1 may also be referred to as a feedthrough mounting surface as at least a conductive portion of the same, e.g., the conductive traces patterned thereon, extends out from the cavity 260 of the housing 209. The first mounting surface 272-1 includes a plurality of filtering capacitors 231 mounted thereon. The filtering capacitors 231 may be utilized when driving the plurality of laser arrangements to maintain signal integrity, e.g., by reducing noise, stabilizing the DC signal, for example.

On the other hand, the second mounting surface 272-2 is disposed within the cavity 260 of the housing 209 and is disposed at the offset D from that of the first mounting surface 272-1. The second mounting surface 272-2 may be accurately referred to as an internal mounting surface or a recessed mounting surface whereby the mounting surface 272-2 is fully within the cavity 260 of the housing 209 and below the first mounting surface 272-1. In addition, the second mounting surface 272-2 be vertically offset from the laser diode (LD) submounts 280-1, 280-2 such that the LD submounts 280-1, 280-2 are below a horizontal plane extending from the second mounting surface 272-2 (see FIG. 7). In other embodiments, the second mounting surface 272-2 may be substantially coplanar with and proximate to the LD submounts 280-1, 280-2.

Continuing with FIG. 6, wire bonds 238 electrically couple the first and second LDD chips 242-1, 242-2 to laser diodes of the plurality of laser arrangements 274 and are relatively short to advantageously reduce issues such as time of flight (TOF) and impedance mismatches, for example. Electrical interconnects other than wire bonds may be utilized, and the example embodiment of FIG. 6 should not be construed as limiting.

The first and second LDD chips 242-1, 242-2 can electrically couple to the plurality filtering capacitors 231 via wire bonds, for instance, although other types of interconnects are within the scope of this disclosure. In addition, the plurality of laser arrangements 274 electrically couple to the electric traces 239 of the second mounting surface 272-1. The electrical traces 239 then couple to the traces 233 of the first mounting surface 272-1, and ultimately circuitry of the substrate 202, to complete an electrical circuit for RF and power signals.

Figure 7:
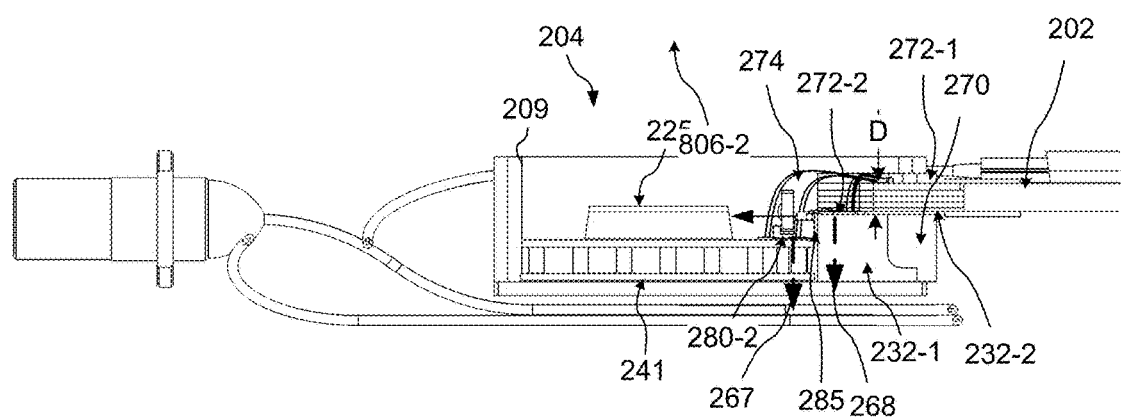
FIG. 7 shows a cross-sectional view of the multi-channel TOSA arrangement of FIG. 4A in accordance with an embodiment of the present disclosure.
Figure 8:
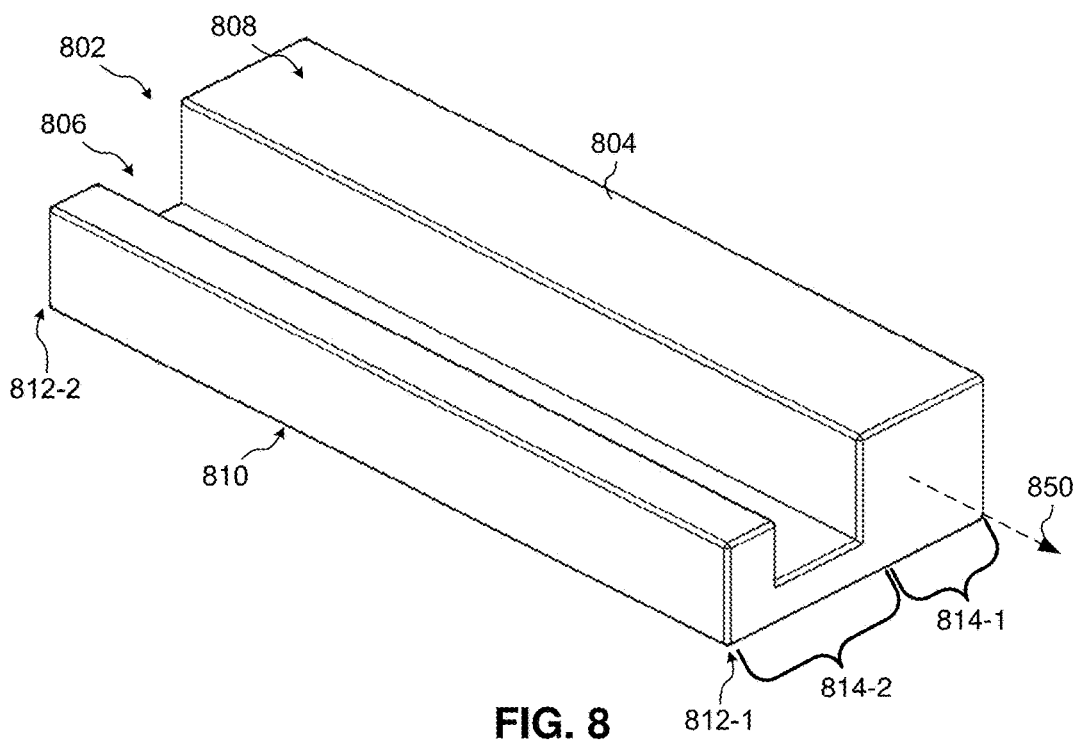
FIG. 8 shows a perspective view of an example lens clip in accordance with an embodiment of the present disclosure.

The cross-sectional view of FIG. 7 shows additional aspects of the multi-channel TOSA arrangement 204 in accordance with an embodiment. As shown, the multiplexing device 225 and the plurality of laser arrangements 274 are supported by a thermoelectric cooler (TEC) 241. To this end, the TEC 241 can provide one or more mounting surfaces to couple to active and/or passive optical components. The plurality of laser arrangements 274 mount/couple to the TEC 241 via the LD submount 266, as shown, or can directly mount to the TEC 241 depending on a desired configuration.

As further shown, first and second LD chips 242-1, 242-2 couple to and are supported by the second mounting surface 272-2. The first and second LDD chips 242-1, 242-2 are therefore in thermal communication with the housing 209 via feedthrough device 270 for heat dissipation purposes. As shown in the embodiment of FIG. 7, an air gap 285 separates the first and second LDD chips 242-1, 242-2 from the plurality of laser arrangements 274. Accordingly, the plurality of laser arrangements 274 are in thermal communication with the housing 209 and/or the TEC 241 via a first thermal conduction path 267 to dissipate heat. On the other hand, the LDD chips 242 are in thermal communication with the housing 209 via a second thermal conduction path 268 provided at least in part by the feedthrough device 270 that extends from the mounting surfaces 272-1, 272-2 to the metal housing 209 to dissipate heat. The first and second thermal conduction paths 267, 268 are separate and distinct, which provides thermal isolation from each other as well as other components of the multi-channel TOSA arrangement 204. Accordingly, less power may be consumed by the TEC 241 to ensure nominal performance of the multi-channel TOSA arrangement 204 based on the feedthrough device 270 dissipating heat communicated from the first and second LDD chips and/or filtering capacitors 231.

In operation, the multi-channel TOSA arrangement 204 receives an RF driving signal and power from the substrate 202. In particular, the optical components such as the plurality of laser arrangements 274 receive the RF driving signal and power via the traces 233, 239. In response, the plurality of laser arrangements 274 then modulate and launch channel wavelengths based on the received RF driving signal. The channel wavelengths are then received at the input region 282 of the multiplexing device 225. The multiplexing device 225 then multiplexes the received channel wavelengths and outputs a multiplexed signal to the transmit optical coupling receptacle 222 by way of output port 284 and intermediate fiber 294.

Referring to FIGS. 8-11, a lens clip 802 is shown consistent with an embodiment of the present disclosure. The lens clip 802 includes a body 804 (or base 804), a lens slot 806, at least one mounting surface 808, and at least one mating surface 810. In more detail, the body 804 extends along a longitudinal axis 850 from a first end 812-1 to a second end 812-2. The lens slot 806 extends length-wise along the body 804 and can securely hold a plurality of optical lenses in alignment relative to associated optical components, as discussed in greater detail below.

The body 804 of the lens clip 802 may comprise, for example, a metal, metal alloy, or any other suitably rigid material. Preferably, the body 804 of the lens clip 802 is at least partially transparent (e.g., at least 80% of incident wavelengths pass therethrough), for purposes of securely attaching focus lenses into the lens slot 806 using a UV-curing epoxy, for example. The body 804 may be formed as a single monolithic piece of material, or from multiple pieces depending on a desired configuration.

The body 804 of the lens clip 802 includes at least first and second portions 814-1, 814-2. The first portion 814-1 extends substantially parallel with the longitudinal axis 850 and provides a step/shelf from the first end 812-1 to the second end 812-2, with the step/shelf being defined at least in part by the at least one mounting surface 808. The first portion 814-1 includes a height H1 that provides the step/shelf for the at least one mounting surface 808 such that an imaginary line drawn extending along the surface defining the at least one mounting surface 808 is offset from a top surface 816 defined by the second portion 814-2 (See FIG. 9). This advantageously avoids the second portion 814-2 from obstructing a light path of an optical component, e.g., a laser diode, mounted to the at least one mounting surface 808. In an embodiment, the height H1 of the first portion 814-1 is about 1 millimeter (mm), and preferably is 0.69 mm, although other heights are within the scope of this disclosure.

Figure 9:
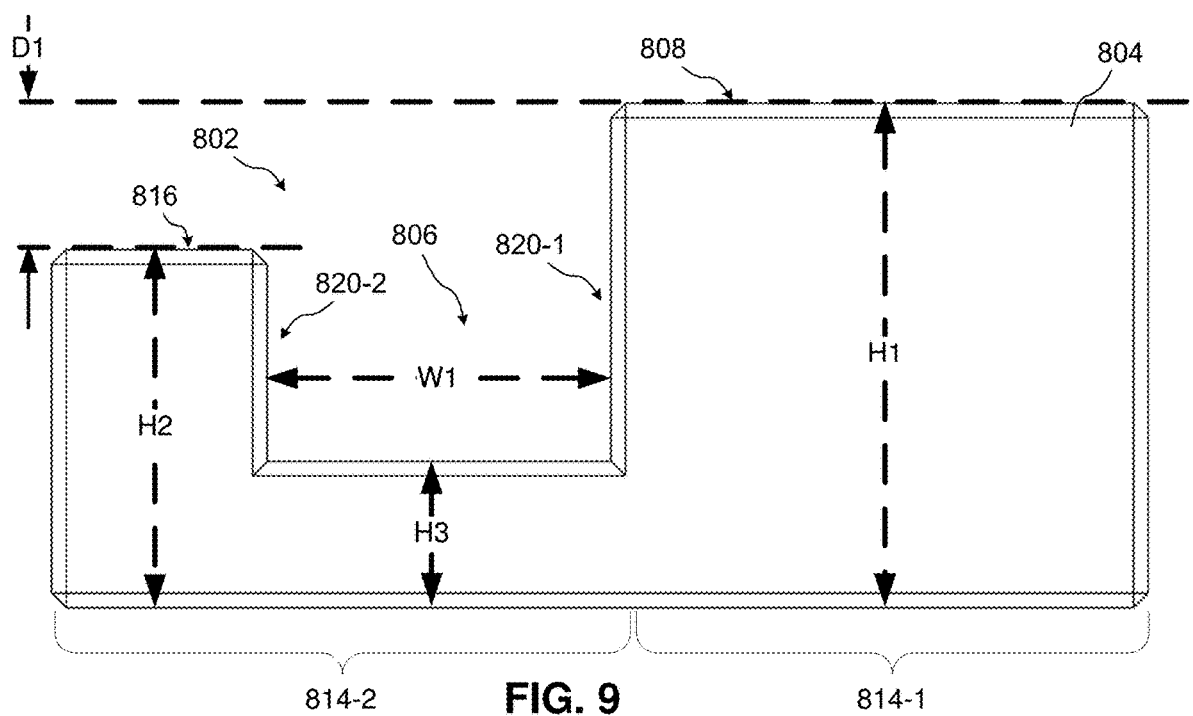
FIG. 9 shows a side view of the example lens clip of FIG. 8 in accordance with an embodiment of the present disclosure.
Figure 10:
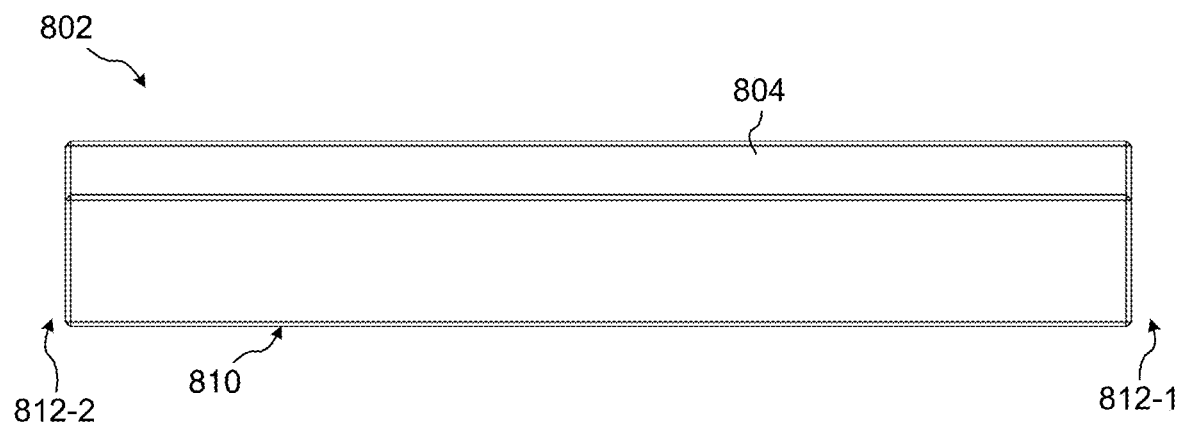
FIG. 10 shows a front view of the example lens clip of FIG. 8 in accordance with an embodiment of the present disclosure.
Figure 11:
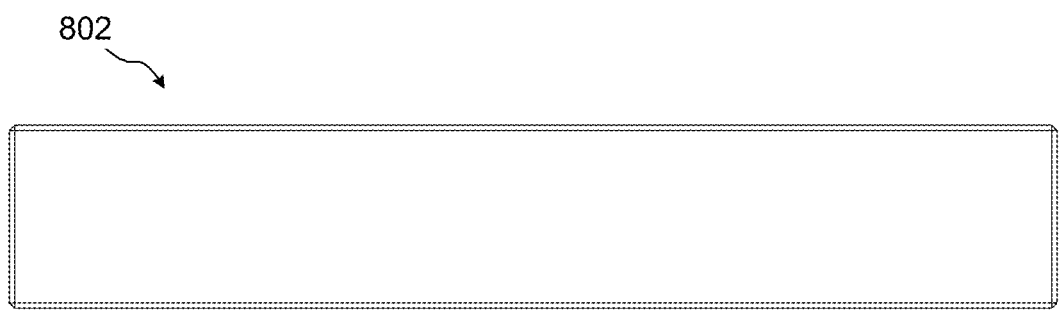
FIG. 11 shows a back view of the example lens clip of FIG. 8 in accordance with an embodiment of the present disclosure.

The second portion 814-2 of the body 804 also extends substantially parallel with the longitudinal axis 850 and the first portion 814-1. The second portion 814-2 defines a shoulder/step having a height H2 that extends from the first end 812-1 to the second end 812-2. In the embodiment of FIG. 9, the height H2 of the second portion 814-2 is less than the height H1 of the first portion 814-1 to provide the offset distance D1, as discussed above. As further shown, height H3 of the portion that defines the bottom of the lens slot 806 and that extends between the first and second portions 814-1, 814-2 measures less than heights H1 and H2.

As further shown, the first and second portions 814-1, 814-2 collectively define the lens slot 806. In particular, a first sidewall 820-1 provided by the first portion 814-1 is disposed opposite a second sidewall 820-2 provided by the second portion 814-2. The first and second sidewalls 820-1, 820-2 extend substantially parallel with each other and have a gap extending therebetween, with the gap having a width of W2 to provide the lens slot 806. Bottom surface 820-3 extends substantially transverse relative to the first and second sidewalls 820-1, 820-2 and adjoins the two. Accordingly, the lens slot 806 can have a U-shaped profile, such as shown in FIG. 9, to generally correspond with the profile of the focus lenses. However, other shapes/profiles for the lens slot 806 are within the scope of this disclosure.

The at least one mating surface 810 can be substantially flat, as shown, to couple to a sidewall of a subassembly housing. The at least one mating surface 810 may also allow for thermal coupling with the a heatsink, e.g., the subassembly housing, to promote thermal communication between optical components mounted to the at least one mounting surface 808 and the heatsink.

Figure 12:
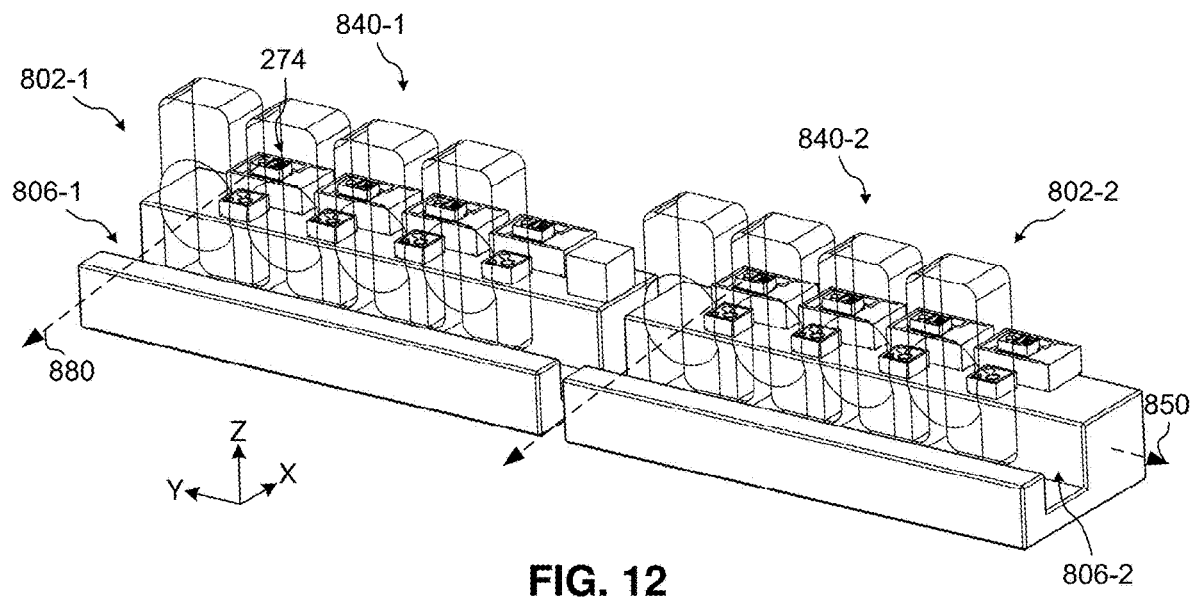
FIG. 12 shows first and second lens clips disposed coaxially with each other in accordance with an embodiment of the present disclosure.

Likewise, the at least one mounting surface 808 can be substantially flat to couple to and support optical components such as laser arrangements (See FIG. 12).

Figure 13:
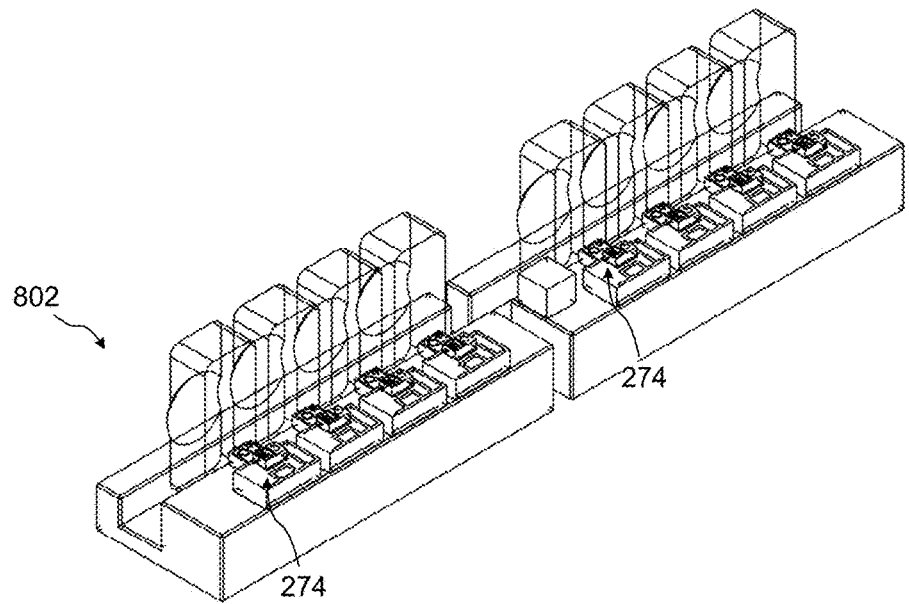
FIG. 13 shows another perspective view of the first and second lens clips of FIG. 12 in accordance with an embodiment of the present disclosure.

Turning to FIGS. 12-13, a plurality of lens clips are shown consistent with an embodiment. In particular, first and second lens clips 802-1 and 802-2 are disposed coaxially with each other such that a common longitudinal axis 850 extends therethrough. This coaxial arrangement is particularly well suited for use in multi-channel TOSAs, as is discussed in greater detail below.

Continuing with reference to FIGS. 12-13, each of the first and second lens clips 802-1, 802-2 include first and second arrays of focus lenses 840-1, 840-2, respectively. Each of the first and second arrays of focus lenses 840-1, 840-2 couple to their respective lens clip via lens slots 806-1, 806-2, respectively. In particular, at least a portion of each focus lens gets inserted into an associated lens slot to securely hold the same in position relative to associated optical components. For instance, as shown in FIG. 12, the laser arrangement 274 is aligned with an associated focus lens such that, when the same gets inserted into slot 806-1, the light path 880 extends from an emission face of an LD of the laser arrangement 274 through the associated focus lens. Thus, each laser arrangement attached to the first and second lens clips 802-1, 802-2 can optically align with respective focus lenses by virtue of the mechanical alignment along the X, Y and Z axis provided by virtue of the lens slots dimension and location relative to the mounting surfaces of the first and second lens clips 802-1, 802-2 that support the laser arrangements. As shown, this can result in each laser arrangement having an optical path extending therefrom that extends substantially parallel with each other. Likewise, in an embodiment the lens slot is configured to securely hold and position each received optical lens in a collinear orientation such that the optical axis of each optical lens extend substantially parallel relative to each other.

In addition, and briefly returning to FIG. 7, the first and second lens clips 840-1, 840-2 may be implemented as the LD submounts 280-1, 280-2. Thus, a technician can optionally couple focus lenses and laser arrangements into each lens clip and perform alignment of the two separate and apart from the TOSA housing. A technician can then insert each lens clip into the housing in at least a partially-completed form such that the optical alignment of the laser arrangements with the input region of the multiplexer 225 is established by simply disposing each lens clip at a predetermined location, e.g., on a TEC or other submount, and measuring resulting output power. This allows for increased tolerances as each lens clip can be adjusted as a single unit along the X and Y axis until desired output power is measured. Accordingly, multi-channel TOSAs consistent with the present disclosure can be assembled with 4, 8, 16, 24, 32 or N channels in a manner that allows for optical alignment of multiple laser diodes and associated diodes in groups of two or more (depending on lens slot dimension, desired channel counts, etc.).

In accordance with an aspect of the present disclosure a lens clip for use in an optical subassembly is disclosed. The lens clip to mount and align an array of optical lenses with associated optical components, the lens clip comprising a body having a first end that extends to a second end, the body defining a lens slot that extends between the first and second end, and wherein the lens slot is configured to receive at least a portion of each optical lens of the array of optical lenses, a mating surface defined by the body to couple the lens clip to an optical subassembly housing, a mounting surface defined by the body, the mounting surface disposed along the lens slot and configured to couple to and support a plurality of optical components, and wherein the lens slot is configured to optically align each optical lens of the array of optical lenses with an associated optical component mounted to the at least one mounting surface.

In accordance with another aspect a transmitter optical subassembly (TOSA) arrangement is disclosed. The TOSA arrangement comprising a housing having a plurality of sidewalls that define a cavity therebetween, a first lens clip disposed in the cavity, the first lens clip defining a mating surface to couple to the housing and a lens slot to receive and couple to a plurality of focus lenses, an array of focus lenses disposed in the first lens slot, and a first plurality of laser arrangements disposed on a surface of the first lens clip, each laser arrangement of the first plurality of laser arrangements having a laser diode optically aligned with an associated focus lens of the first array of focus lenses.

In accordance with another aspect a method for assembling an optical subassembly is disclosed. The method comprising mounting a plurality of laser assemblies to a mounting surface provided by a lens clip, inserting a plurality of optical lenses into a lens array slot defined by the lens clip and aligning each optical lens of the plurality of optical lenses with an associated laser assembly of the plurality of laser assemblies, mounting the lens clip within a cavity of a transmitter optical subassembly (TOSA) housing, and aligning the lens clip with an arrayed waveguide grating (AWG) within the housing.

While the principles of the disclosure have been described herein, it is to be understood by those skilled in the art that this description is made only by way of example and not as a limitation as to the scope of the disclosure. Other embodiments are contemplated within the scope of the present disclosure in addition to the exemplary embodiments shown and described herein. Modifications and substitutions by one of ordinary skill in the art are considered to be within the scope of the present disclosure, which is not to be limited except by the following claims.

What is claimed is:

1. A lens clip for use in an optical subassembly to mount and align an array of optical lenses with associated optical components, the lens clip comprising:
    a body having a first end that extends to a second end, the body defining a lens slot that extends between the first and second end, and wherein the lens slot is configured to receive at least a portion of each optical lens of the array of optical lenses;
    a mating surface defined by the body to couple the lens clip to an optical subassembly housing;
    a mounting surface defined by the body, the mounting surface disposed along the lens slot and configured to couple to and support a plurality of optical components; and wherein the lens slot is configured to optically align each optical lens of the array of optical lenses with an associated optical component mounted to the at least one mounting surface;

wherein the lens slot is defined at least in part by first and second sidewalls that extend substantially parallel with each other, the first and second sidewalls being provided by first and second portions of the body; and wherein the first sidewall extends to a height H1 and the second sidewall extends to a height H2, the first height H1 being greater than the second height H2.

2. The lens clip of claim 1, wherein the body is formed from a transparent material, the transparent material allowing for at least 50% of incident light to pass into the lens slot.

3. The lens clip of claim 1, wherein the lens slot is configured to receive and couple to at least two optical lenses.

4. The lens clip of claim 1, further comprising a plurality of optical components coupled to the mounting surface, the plurality of optical components comprising a plurality of laser diodes to output a plurality of channel wavelengths, and wherein the lens slot is configured to optically align each optical lens of the array of optical lenses with a corresponding laser diode of the plurality of laser diodes based on a position of each optical lens within the lens slot relative to a position of the corresponding laser diode on the mounting surface.

5. The lens clip of claim 1, wherein the lens slot is configured to position each received optical lens in a collinear orientation such that an optical axis of the optical lenses extend substantially parallel relative to each other.

6. The lens clip of claim 1, wherein the lens slot extends through the body such that the lens slot forms an opening at the first and second end of the body.

7. The lens clip of claim 1, wherein the body is formed of a single, monolithic piece of material.

8. The lens clip of claim 1, further comprising the array of optical lenses disposed in the lens slot and a plurality of optical components disposed on the mounting surface, a position of each optical lens of the array of optical lenses being fixed along first and second axis and movable along a third axis by virtue of the lens slot, the third axis extending substantially parallel with the lens slot and a longitudinal axis of the lens clip.

9. The lens clip of claim 1, further comprising a layer of UV-curing epoxy disposed in the lens slot between adjacent optical lenses and/or interstitial spaces between sidewalls of the lens slot and sides of each optical lens, and wherein a bottom surface of each optical lens directly contacts a bottom surface of the lens slot to substantially prevent the layer of UV-curing epoxy from flowing between a bottom surface of each optical lens and the sidewall of the lens slot.

10. A lens clip for use in an optical subassembly to mount and align an array of optical lenses with associated optical components, the lens clip comprising:

a body having a first end that extends to a second end, the body defining a lens slot that extends between the first and second end, and wherein the lens slot is configured to receive at least a portion of each optical lens of the array of optical lenses;

a mating surface defined by the body to couple the lens clip to an optical subassembly housing;

a mounting surface defined by the body, the mounting surface disposed along the lens slot and configured to couple to and support a plurality of optical components;

wherein the lens slot is configured to optically align each optical lens of the array of optical lenses with an associated optical component mounted to the at least one mounting surface;

wherein the array of optical lenses are disposed in the lens slot and a plurality of optical components are disposed on the mounting surface, a position of each optical lens of the array of optical lenses being fixed along first and second axis and movable along a third axis by virtue of the lens slot, the third axis extending substantially parallel with the lens slot and a longitudinal axis of the lens clip.

11. A lens clip for use in an optical subassembly to mount and align an array of optical lenses with associated optical components, the lens clip comprising:

a body having a first end that extends to a second end, the body defining a lens slot that extends between the first and second end, and wherein the lens slot is configured to receive at least a portion of each optical lens of the array of optical lenses;

a mating surface defined by the body to couple the lens clip to an optical subassembly housing;

a mounting surface defined by the body, the mounting surface disposed along the lens slot and configured to couple to and support a plurality of optical components;

wherein the lens slot is configured to optically align each optical lens of the array of optical lenses with an associated optical component mounted to the at least one mounting surface; and a layer of UV-curing epoxy disposed in the lens slot between adjacent optical lenses and/or interstitial spaces between sidewalls of the lens slot and sides of each optical lens, and wherein a bottom surface of each optical lens directly contacts a bottom surface of the lens slot to substantially prevent the layer of UV-curing epoxy from flowing between a bottom surface of each optical lens and the sidewall of the lens slot.

* * * * *